July 22, 1924.

Re. 15,877

C. J. HAZELTON

HOSE SUPPORTER BUTTON

Original Filed March 11, 1922

INVENTOR

Carl J. Hazelton

BY

Santlyer & Santlyer

ATTORNEYS

Reissued July 22, 1924. Re. 15,877

UNITED STATES PATENT OFFICE.

CARL J. HAZELTON, OF WORCESTER, MASSACHUSETTS, ASSIGNOR TO AMERICAN NARROW FABRIC COMPANY, OF WORCESTER, MASSACHUSETTS, A CORPORATION OF MASSACHUSETTS.

HOSE-SUPPORTER BUTTON.

Original No. 1,432,694, dated October 17, 1922, Serial No. 543,061, filed March 11, 1922. Application for reissue filed July 2, 1923. Serial No. 649,175.

*To all whom it may concern:*

Be it known that I, CARL J. HAZELTON, a citizen of the United States, and resident of Worcester, county of Worcester, and State of Massachusetts, have invented certain new and useful Improvements in Hose-Supporter Buttons, of which the following is a specification.

My invention relates to a button for hose supporters, particularly to the manner of attaching the same to a base plate.

An object of my invention is to provide an improved and simplified means for attaching a rubber collet to a base plate of sheet metal or other material.

A further object is to provide an attaching means which will positively prevent turning of the rubber collet on its axis.

A further object of my invention is the provision of a hose supporter provided with a button or collet held to a base plate by a fastening device which is passed through the collet and holds it effectively, the outer surface of the head of the collet if desired remaining smooth and uninterrupted.

In the accompanying drawings,—

Prior to my invention it has been customary in the hose supporter art to fasten rubber collets on a base plate by means of a central headed cylindrical rivet or stud passing through the collet and through the base plate the rivet being headed over on the back of the latter. After the supporter has been used for some time, however, collets held in place in this manner work loose and turn on the rivet or stud as a center. Such construction causes the collet to become so worn in a short time as to enable the collet to slip off of the holding rivet entirely. The disadvantage of this type of construction is much more serious in the case of collets which are given a shape other than round in order to improve the holding of the top of the stocking as it not only permits of the collet becoming loose and coming off altogether but by permitting the collet to turn on its rivet or stud the advantages realized by the particular shape of the collet may no longer be availed of.

Figure 1:
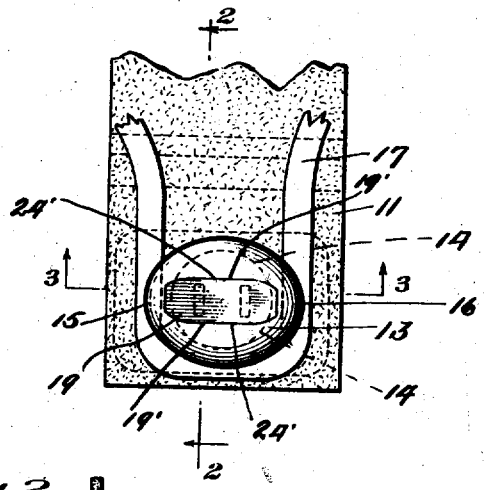
Fig. 1 is a front view of a hose supporter provided with a collet or button constructed in accordance with this invention.
Figure 2:
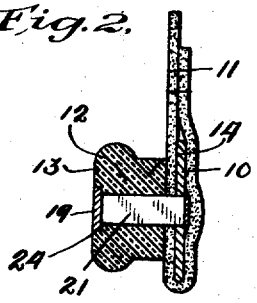
Fig. 2 is a longitudinal central sectional view of the same taken substantially on the line 2—2 of Fig. 1.
Figure 3:
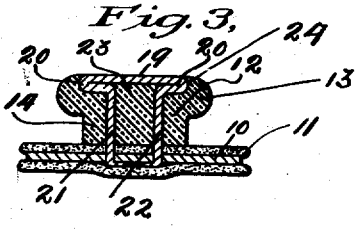
Fig. 3 is a transverse sectional view taken on the line 3—3 of Fig. 1.

Referring to Figs. 1, 2 and 3 of the accompanying drawings,—10 designates a flat metal base plate which is supported by narrow fabric 11 to which it may be attached in any suitable manner. On this plate is mounted a rubber collet 12. This collet has an oblong head 13 the long axis thereof extending transversely of the length of the hose supporter. The collet is provided with a shank 14 smaller in diameter than the head transversely of the hose supporter to provide projecting portions or surfaces or flanges 15 and 16 on the head of the collet so that the wire holding loop 17 forming a part of the supporter will pass under these projecting portions 15 and 16 of the collet head to securely hold the fabric of the stocking to the collet.

For the purpose of fastening the collet 12 in position I provide a staple-like member passing entirely through the collet, this member being preferably made of flat wire and provided with an elongated head 19 which in the present instance is doubled under at both ends to form ends 20 of double thickness and then bent downwardly to form the fastening prongs 21 and 22. The legs or prongs 21 and 22 pass through two spaced perforations in the collet the portion of the collet lying between the perforations for the staple legs or prongs and designated 23 being solid and integral with the rest of the collet. The head of the staple which is substantially rectangular in plan in the present instance, and has straight sides 19′ is preferably disposed in a non-circular depression or groove 24 in the head of the collet this groove being elongated to correspond to the shape of the head 19 of the staple to provide straight sides 24′. The long axis of the groove or depression 24 extends longitudinally of the oval head of the button or collet to provide a structure wherein both the groove and staple head extend longitudinally of the button or collet head. The long straight sides 24′ of the groove or depression 24 cooperate with the long straight sides 19′ of the head of the staple to prevent turning of the collet relatively to the staple. It will be seen therefore that the spaced legs or prongs of the staple and the combined action of the head of the staple and the groove or depression in the head of the collet and their disposition relatively to the long axis of the button head effectively prevent turning of the collet on the staple as well as removal of the collect, thereby providing a structure by which the collet is held securely to the base plate and the advantages of the elongated collet head are available at all times.

By properly proportioning the head of the staple and the depth of the depression or groove 24 in the head of the collet the head of the collet may be substantially smooth, the head of the staple being flush with the outer surface of the collet head. This construction while preferable is not essential however so far as retaining the collet in place is concerned as the head of the staple may be thicker if desired than the depth of the groove or depression 24 so as to project slightly above the top of the collet or it could be disposed slightly below the top of the groove.

Figure 4:
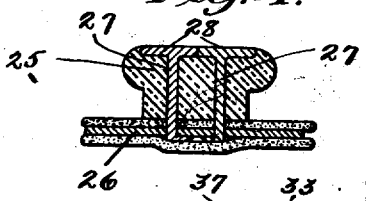
Fig. 4 is a longitudinal section through a modified form of the invention.

In Fig. 4 I have provided a collet 25 which is held in place on a base plate 26 by two securing members 27 T-shaped in cross-section. The heads 28 of these members are formed in such a way as to make as nearly as possible a continuous plate or head on the top of the collet as will be obvious from an inspection of the drawings, the legs of the rivet being spaced from the ends of the head as in the form illustrated in Fig. 1.

Figure 5:
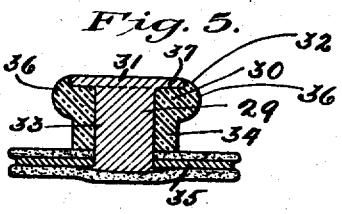
Fig. 5 is a longitudinal central sectional view of a further modified form of the invention.
Figure 6:
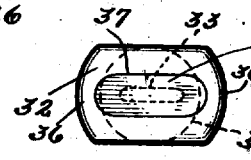
Fig. 6 is a front view of the form of Fig. 5.

In Figs. 5 and 6 I provide a single member 29 for holding the collet 30 in place. This member has a flat head 31 which is elongated as indicated in Fig. 6 to provide straight parallel sides the long axis of the head extending lengthwise of the elongated button or collet head 32. The securing member 29 is provided with a flat shank 33 which passes down through the shank 34 of the collet and the base plate 35 and is riveted over on the back of the latter, the flat sides of this shank being parallel to the straight sides of the rivet head. The ends of the head of the collet extend beyond the shank to provide flanges 36 adapted to cooperate with the holding loop (not shown) but which might be similar to the loop 17 of Fig. 1. The head of the holding rivet or holding member 29 lies in a depression 37 in the elongated head of the button, this depression corresponding in shape to the head of the rivet or stud and extending lengthwise of the button or collet.

In all of the forms above described the metal parts employed for fastening the rubber collet to the base plate may be enameled the same color as the rubber collet if desired.

It will be seen from the foregoing that I have provided a hose supporter comprising a rubber collet held in place by a member or members provided with an elongated head extending transversely of the hose supporter and lengthwise of the collet when the head of the collet is elongated.

It will be seen also that the turning of the collet on its securing means is prevented by the provision of the legs or prongs of the holding devices of Figs. 1 to 4 and the flat shank of the holding device of Fig. 5, assisted by the head or heads of all the various forms of holding devices described and shown in cooperation with the depression or groove in the collet head.

I claim—

1. As an article of manufacture, a hose supporter button comprising an oval rubber collet and a staple for securing it in position said staple having a flat head extending longitudinally of the button at its outer surface and flush therewith and two legs spaced apart extending through the collet to the rear thereof.

2. As an article of manufacture a hose supporter button comprising a rubber collet and a staple for securing it in position said staple having a flat head extending longitudinally of the button at its outer surface and having legs spaced apart extending through the collet to the rear thereof the staple being made of flat wire and being bent inwardly under the ends of the head to form a double thickness and the legs projecting down from the inner ends of the double thickness.

3. In a hose supporter a collet comprising an oval head and a shank, the long axis of the head being transverse of the supporter, a base plate and means passing entirely through the collet and base plate for securing the collet to the base plate said securing means being provided with an elongated head the long axis of which extends transversely of the supporter.

4. In combination, a collet comprising a head and a shank said head being provided with an elongated groove in its top surface, a base plate and means passing entirely through the collet and base plate for securing the collet to the base plate, said securing means being provided with an elongated head lying in and engaging and co-operating with the long sides of said groove.

5. In a hose supporter, in combination a collet comprising an elongated head and a shank, the long axis of the head lying transverse of the supporter, said head being provided with an elongated groove also extending transversely of the hose supporter, a base plate, and means passing through the collet and base plate for securing the collet to the base plate, said securing means being provided with an elongated head lying in said groove and flush with the surface or face of the collet head and co-operating therewith to prevent turning of the collet on the securing means.

6. In combination a collet comprising a head and a shank the top of said head being provided with a groove, a base plate and a member for securing the collet to the base plate, said securing member being provided with a head lying in said groove and with spaced holding legs or prongs passing through said shank and said base plate.

7. In a hose supporter the combination of a collet comprising a head and a shank the top of said head being provided with an elongated groove extending transversely of the supporter, a base plate and a member for securing the collet to the base plate, said securing member being provided with an elongated head lying in said groove and cooperating therewith and with spaced legs passing through the shank of the collet and through said base plate.

8. In a hose supporter the combination of a collet provided with a shank and an elongated head, a base plate and a staple for securing the collet to the base plate, said staple being provided with an elongated head extending lengthwise of the elongated head of the collet.

9. In a hose supporter the combination of a collet provided with a shank and an elongated head, a base plate and a staple for securing the collet to the base plate, said staple being provided with an elongated head extending lengthwise of the collet head and with legs spaced from the ends of said head and from each other, said legs extending through the shank of the collet and through said base plate.

10. In a hose supporter the combination of a collet provided with a shank and an oval head, a base plate and a staple for securing the collet to the base plate, said staple being provided with a substantially rectangular head extending lengthwise of the oval collet head and lying in a substantially rectangular groove therein a portion of the staple at each end of the head being bent under to form a double thickness and bent downwardly from the thickened portion to form a pair of legs spaced from the ends of the head and from each other said legs passing through the collet shank and through said base plate.

This specification signed this 18th day of June, 1923.

CARL J. HAZELTON.